June 20, 1950 J. A. CAMPBELL 2,511,967
GAS AND LIQUID SEPARATOR
Filed April 29, 1948
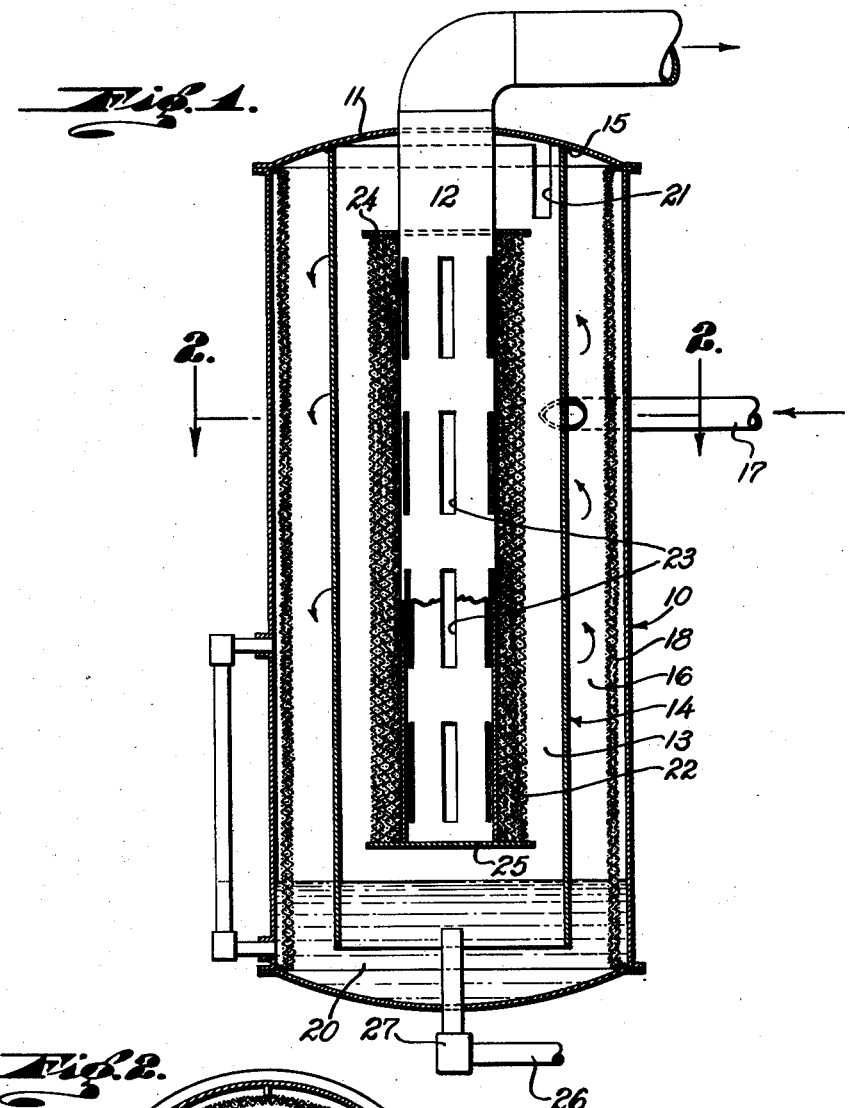
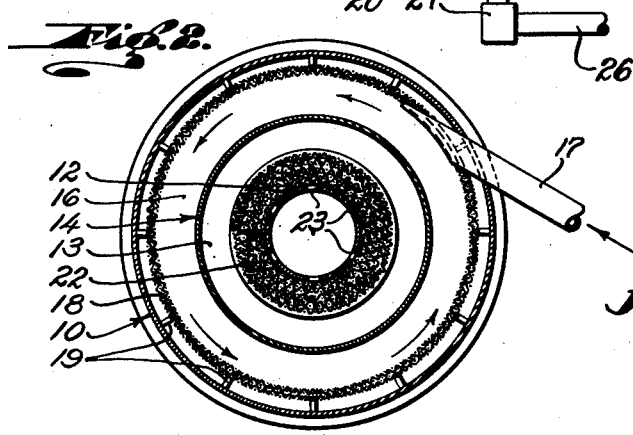
JULIAN A. CAMPBELL
INVENTOR.
BY
ATTORNEY

Patented June 20, 1950

2,511,967

UNITED STATES PATENT OFFICE 2,511,967

GAS AND LIQUID SEPARATOR

Julian A. Campbell, Long Beach, Calif.

Application April 29, 1948, Serial No. 23,937

3 Claims. (Cl. 183—83)

This invention has to do with improvements in separators for removing liquid entrainment from gas, a typical purpose for which the invention has proven highly efficient being the removal of entrained oil from steam.

My general object is to provide in a single shell to which the gas is delivered, two liquid separating effects, the first acting by centrifugal deposition of the liquid particles, and particularly in the presence of a porous medium, to separate and isolate the liquid from the gas stream continuing to the second effect. Any residual liquid remaining in the gas then is completely removed in the second separating effect or stage and withdrawn together with the liquid initially separated.

In its structural aspects the invention contemplates placing in a cylindrical shell a concentric partition or baffle wall dividing the shell interior into an outer annular space and an inside chamber, the gas being discharged tangentially into the outer space to assume a swirling flow causing the liquid to be centrifugally thrown out of the gas. To assure the liquid so separated from becoming reentrained in the gas, I preferably provide a foraminate medium, such as fine mesh screen, in spaced relation to the wall of the shell so that the liquid particles are displaced through the screen into a quiescent zone isolating the liquid from reentrainment. The gas then passes into the interior chamber, preferably through an opening in the baffle wall so located as to require close to 360 degree swirl of the gas in the outer space.

Final separation within the inner chamber of any liquid remaining in the gas is accomplished by filtering the gas through a porous material before the gas enters the outlet. Preferably such filtering is accomplished by extending an apertured outlet tube within the chamber and applying fine mesh screen about the tube so that the gas passes through the screen.

All the various features and objects of the invention, as well as the details of an illustrative embodiment, will be fully understood from the following detailed description of the accompanying drawing, in which:

Fig. 1 is a view showing the separator in vertical section; and

Fig. 2 is a cross section on line 2—2 of Fig. 1.

The parts of the separator are contained within a vertically positioned cylindrical outer shell 10 having a removable head 11 through which extends a gas outlet pipe 12 depending concentrically within the inner shell chamber 13, as and for the purposes later explained. The shell contains a cylindrical baffle 14 opening at its lower end and welded at 15 to the cover 11, the baffle wall being concentric with the shell and dividing its interior into the outer annular space 16 and chamber 13. The feed gas, carrying entrained liquid particles, is introduced to space 16 through an inlet 17, the latter extending tangentially with relation to the space so that the gas is required to assume a high velocity swirling flow about the baffle wall 14, as indicated by the arrows.

Liquid particles centrifugally separated from the gas by reason of its flow condition in space 16, are isolated from possible reentrainment in the gas by passage through one or more layers of screen 18, for example 14 mesh copper fly screen, positioned adjacent and in spaced relation to the shell 10 by application to the vertically extending spacers 19, e. g., 1/8 inch diameter wires welded to the shell. Upon being projected against the screen the liquid particles pass through these openings into the quiescent space between the screen and shell, the liquid then draining down along the shell wall for collection in the body 20 of liquid in the base of the shell. As illustrated, the lower end of the baffle wall 14 is immersed in the liquid, the latter thus forming a seal against gas escape from the space 16. The gas passes from space 16 into chamber 13 through a slotted opening 21 in the top of baffle wall 14, the latter being positioned circularly of the shell with relation to the inlet 17, so that the gas is required to flow an angular distance in excess of 180°, and preferably close to 360° in space 16 before passing through opening 21 into the chamber 13.

Any liquid particles remaining in the gas are removed in advance of its entry to the outlet pipe 12, by passage through one or more layers of screen 22 wrapped about an extent of the outlet tube containing the gas passing slots 23. The screen may be confined between flanges or plates 24 and 25 secured to the outlet tube, the lower plate 25 serving also as a closure for the end of the tube. Liquid separated from the gas by the screen 22 collects in the bottom of the shell and is removed through discharge line 26 into which is connected the usual trap 27.

It is noted that baffle wall 14 is imperforate axially between inlet 17 and baffle wall opening 21 to thus require upward axial movement of the incoming fluid during the first stage of separation. Also, the baffle wall and outlet tube 12 are both imperforate axially between opening 21 and the uppermost opening 23 to require reversal of the direction of flow and axial movement downwardly after passage of the fluid through opening 21.

I claim:

1. A liquid and gas separator comprising a cylindrical shell, a gas outlet tube extending axially within and out of the shell, a baffle wall between and annularly spaced from said shell and tube, an inlet through which gas is tangentially admitted to the space between said baffle wall and shell, said wall containing at one of its ends and axially spaced from said inlet an opening located in excess of 180 degrees beyond said inlet in the direction of swirling gas flow in said space and through which the gas passes into a chamber inside of said wall for delivery to said tube, said wall being imperforate between said inlet and opening in the direction of gas flow, liquid separating from the gas in said space settling to a bottom portion thereof in communication with a liquid collecting space in the bottom of the shell.

2. A liquid and gas separator comprising a cylindrical shell, a gas outlet tube extending axially within and out of the shell, a baffle wall between and annularly spaced from said shell and tube, a circular plate disposed across the end of said tube within said shell and extending outwardly beyond said tube to form a radial flange, a second circular radial flange of the same diameter as said plate carried about said tube within the shell and axially spaced from said plate, a porous liquid separating material carried about said tube between said flanges, an inlet through which gas is admitted to the space between said baffle wall and shell, means passing the gas from said space to a chamber inside said wall for delivery through said porous material and into the tube through an opening in the side thereof, liquid separating from the gas through said porous material gravitating to a collection space in the bottom of the shell.

3. A liquid and gas separator comprising a vertically extending cylindrical shell, a gas outlet tube extending axially within and out of the shell and having an aperture within said shell for gas escape, a baffle wall between and annularly spaced from said shell and tube, an inlet through which gas is tangentially admitted to the space between said baffle wall and shell, said wall containing an opening located at one of its ends in excess of 180 degrees beyond said inlet in the direction of swirling gas flow in said space and through which the gas passes into a chamber inside of said wall for delivery to said tube, said outlet tube aperture and said inlet being axially spaced in a common direction from said baffle wall opening, said baffle wall being imperforate between the location of said inlet and the baffle wall opening in the direction of gas flow to require all gas flowing therebetween to travel both annularly in excess of 180° and in a first axial direction, and said outlet tube and the baffle wall both being imperforate axially between the baffle wall opening and said outlet tube aperture to require passage of the gas in the reverse axial direction within said inside chamber, liquid separating from the gas in said space settling to a bottom portion thereof in communication with a liquid collecting space in the bottom of the shell.

JULIAN A. CAMPBELL.

REFERENCES CITED

The following references are of record in the file of this patent:

UNITED STATES PATENTS

| Number | Name | Date |
|---|---|---|
| 1,505,743 | Stebbins | Aug. 19, 1924 |
| 1,505,744 | Stebbins | Aug. 19, 1924 |
| 1,791,304 | Flick | Feb. 3, 1931 |
| 2,432,757 | Weniger | Dec. 16, 1947 |

FOREIGN PATENTS

| Number | Country | Date |
|---|---|---|
| 17,568 | Great Britain | Sept. 28, 1916 |